(12) United States Patent
Allegre et al.

(10) Patent No.: US 6,658,933 B2
(45) Date of Patent: Dec. 9, 2003

(54) FILL-LEVEL INDICATOR FOR A LIQUEFIED-PETROLEUM-GAS TANK

(75) Inventors: Xavier Allegre, Clermont-Ferrand (FR); Danier Bouvier, Paris (FR); Gilbert Spiesser, Orcet (FR)

(73) Assignee: Clesse Industries (FR)

( * ) Notice: Subject to any disclaimer, the term of this patent is extended or adjusted under 35 U.S.C. 154(b) by 0 days.

(21) Appl. No.: 09/888,038

(22) Filed: Jun. 22, 2001

(65) Prior Publication Data

US 2002/0194911 A1 Dec. 26, 2002

(51) Int. Cl.$^7$ ............................................... G01F 23/00
(52) U.S. Cl. ................ 73/293; 73/290 R; 250/357.001; 250/900; 250/902; 340/619
(58) Field of Search ............................... 73/293, 290 R; 250/902, 900, 357.1; 340/619; 702/55

(56) References Cited

U.S. PATENT DOCUMENTS

| 3,844,171 | A |   | 10/1974 | Rodger |         |
|-----------|---|---|---------|--------|---------|
| 4,002,062 | A | * | 1/1977  | Kuno et al. | 377/24 |
| 4,051,726 | A |   | 10/1977 | Hastbacka |      |
| 4,118,634 | A | * | 10/1978 | Carvalko et al. | 250/577 |
| 4,286,464 | A |   | 9/1981  | Tauber et al. |    |
| 4,494,487 | A | * | 1/1985  | Nixon | 123/1 A |
| 4,961,069 | A | * | 10/1990 | Tsaprazis | 250/577 |
| 5,381,022 | A | * | 1/1995  | Nemeth et al. | 250/577 |
| 6,427,533 | B1| * | 8/2002  | Yoshida | 340/618 |

FOREIGN PATENT DOCUMENTS

| EP | 0 447 728 | 9/1991 |
| EP | 0 795 740 | 9/1997 |
| GB | 888 941   | 2/1962 |
| GB | 2 029 005 | 3/1980 |

* cited by examiner

*Primary Examiner*—Edward Lefkowitz
*Assistant Examiner*—Michael Cygan
(74) *Attorney, Agent, or Firm*—Cantor Colburn LLP

(57) ABSTRACT

Fill-level indicating device includes an array of optical detectors attached to a mount, vertically spaced apart relative to one another and distributed within the tank over the height of the latter, with each detector including a light source and a receiver, and means for feeding electric power to the light sources of the various detectors, for processing the signals arriving at the various receivers and for transmitting these to a liquefied-gas fill-level display gauge. The mount and the detectors on it are encapsulated in a synthetic resin that is highly transparent to the light beam emitted by the light sources and the surface of the resin facing the detectors is such that the beam emitted by the corresponding light source is reflected toward the associated receiver.

14 Claims, 2 Drawing Sheets

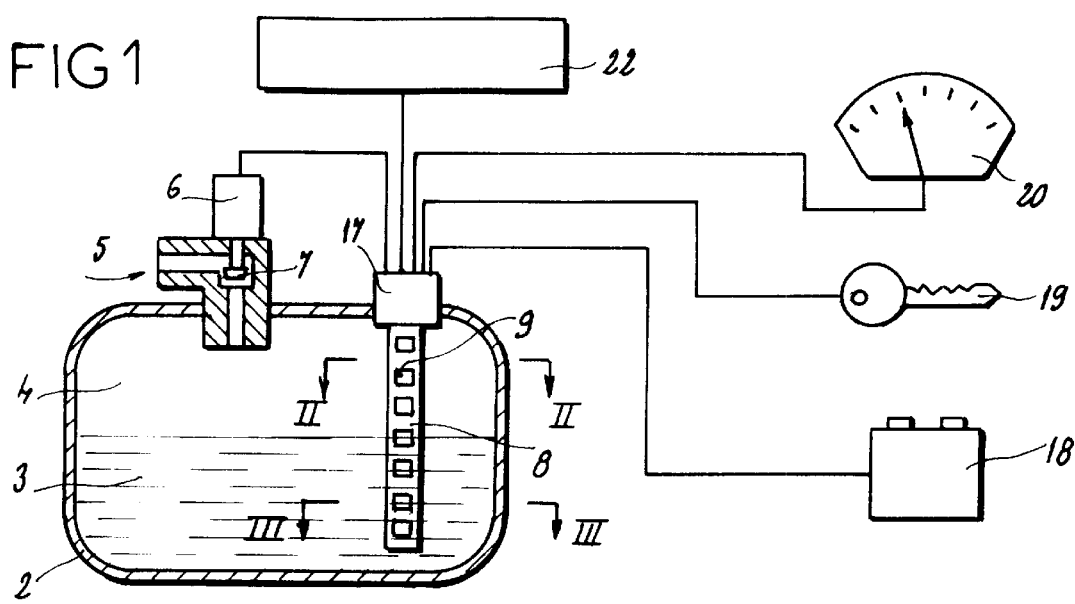
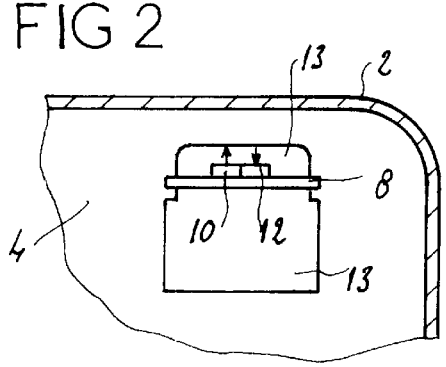
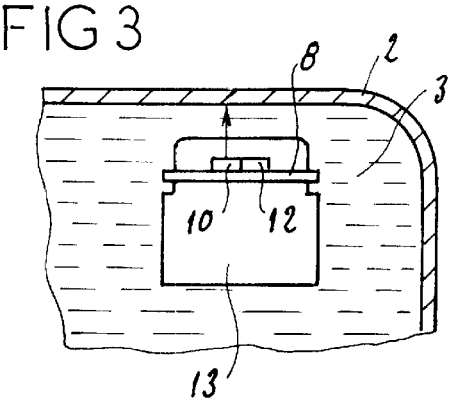
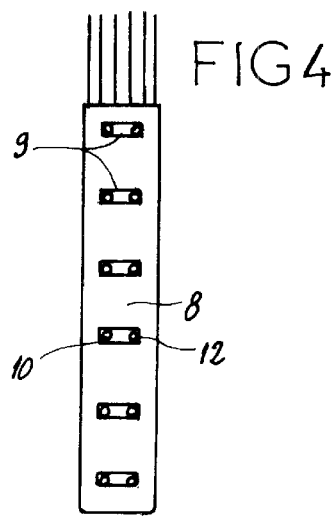
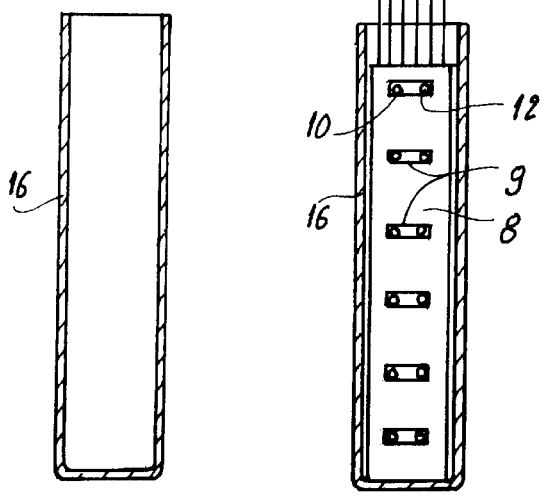

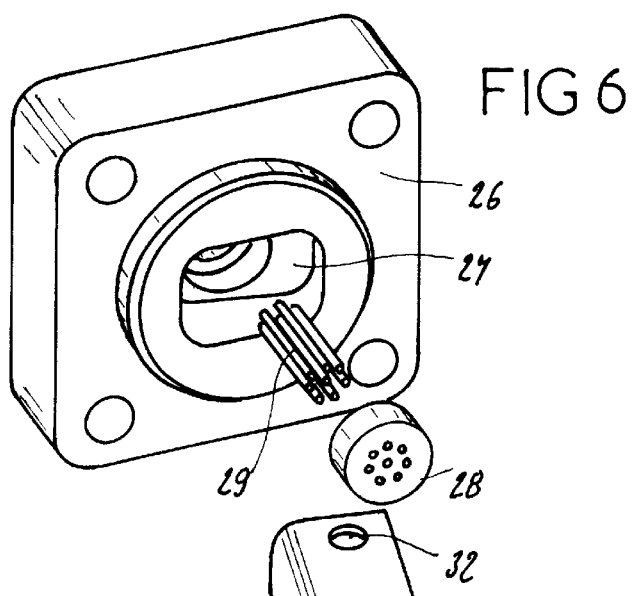
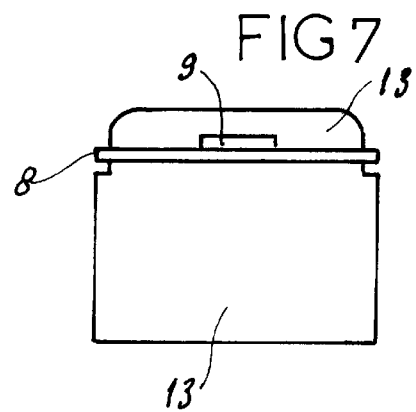
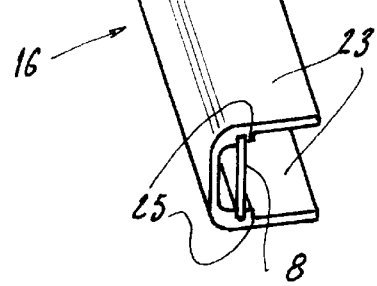
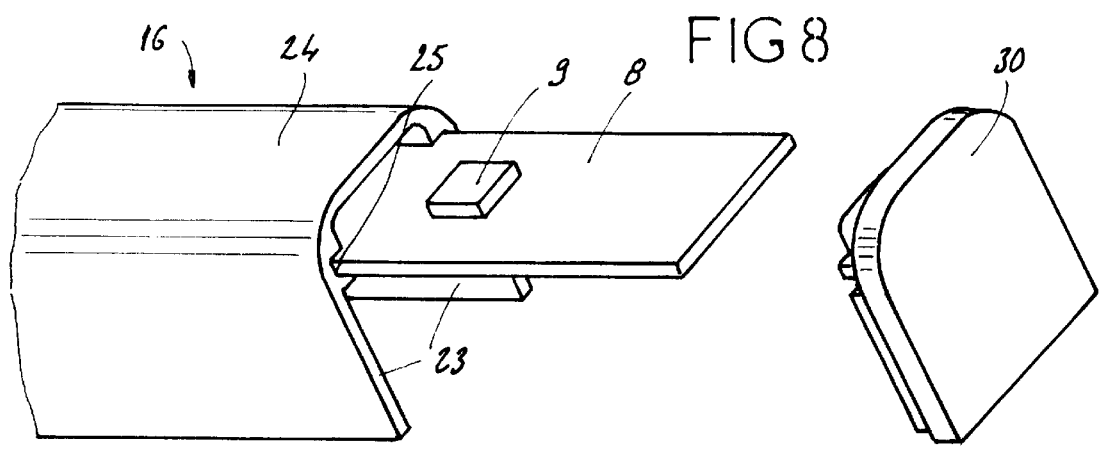

FILL-LEVEL INDICATOR FOR A LIQUEFIED-PETROLEUM-GAS TANK

FIELD OF THE INVENTION

This invention relates to a fill level indicator for use in a liquefied-petroleum-gas tank. The device is particularly suitable for indicating the fill level of an automobile fuel tank.

DESCRIPTION OF THE RELATED ART

In the case of a liquefied-petroleum-gas tank it is important to precisely monitor fill-level changes. In fact, because of fuel expansion, safety considerations dictate that the tank not be filled more than 80% of its total capacity. At the low level a tank must also provide information that allows for instance a switchover to gasoline for fueling the engine.

The gauges that have been employed to date are based on a mechanical float system which has numerous drawbacks including in particular imprecise measurements due to mechanical slack, the risk of malfunction of the mechanical elements due to seizing or wear as they age, random measurement variations due to vehicle movements, the difficulty of compartmentalizing a liquefied gas tank for limiting the movement of the fluid as in the case of a gasoline tank, their bulk in the tank, and the lack of safety.

There exist gauges which incorporate optical detection devices whose operation is based on measuring the difference in the refractive index between liquid and gaseous substances. The U.S. Pat. No. 4,286,464 describes such a fill-level indicator in a tank and especially in an oil reservoir. The fill-level indicator described in that document incorporates an array of vertically staggered optical detectors. Each detector includes a light source such as a gallium and arsenic P-N LED, a receiver such as a flat P-N-P silicon phototransistor, as well as light-beam transmitting elements. These elements transmit the beam from the light source to the receiver when the detector is out of the liquid while the beam is refracted when the detector is immersed in the liquid. Electronic circuitry permits the transmission of the signals received by the detectors to an oil-level display gauge.

SUMMARY OF THE INVENTION

It is the objective of this invention to provide a fill-level indicator for liquefied petroleum gas tanks which indicator is compact, has no moving parts, is highly reliable and can be coupled to additional safety provisions such as a fill lock which is enabled when a certain level is reached or when the engine of the vehicle is running.

The device is designed to employ optical detectors whose detection principle is based on the difference in the refractive index between liquid and gaseous substances.

Accordingly, the indicator presented incorporates the following:

An array of optical detectors on a mount, vertically spaced apart from one another inside the tank and distributed over the height of the tank, with each detector encompassing a light source and a receiver, and Means which power the light sources of the various detectors, process the information received from the different detectors and transmit it to a liquefied-gas fill-level display gauge.

According to the invention, the mount and the detectors on it are enclosed in a synthetic resin that is highly transparent to the light beams emitted by the light sources while the surface of the resin facing the detectors is such that a light beam emitted by the corresponding light source is reflected toward the associated receiver.

This design concept permits the use of optical detectors in a liquefied petroleum gas (LPG) tank in which the ambient conditions are particularly severe. With the resin it is possible to seal the sensor assembly into one solid, single block, providing excellent electrical insulation of these components from the LPG.

The level of the gas inside the tank is measured by processing the signals that have reached the different receivers, based on the fact that each of the receivers positioned in the gaseous phase receives a light beam emitted by the corresponding light source, whereas the other receivers, i.e. those immersed in liquid gas, do not receive such signals.

In one design implementation of this device, each light source consists of a diode which emits a light beam in the visible or infrared wavelength range and each receiver is constituted of a photoelectric cell or a photothyristor.

The resin used may for instance be an epoxy, given that it has a refractive index close to that of the LPG in the liquid phase.

When a detector is positioned in the gaseous phase, the emitted light beam is reflected toward the corresponding receiver since the index of the gas, at close to 1, is optically well below the index of the resin.

When the detector is positioned in the liquid phase, the beam emitted by the light source is essentially diffused in the liquid since the refractive indices of the liquid and of the resin are similar at about 1.3 to 1.4. A small part of the light beam may still be reflected toward the receiver, but the sensitivity of the latter is not such as to register light of this weak a magnitude.

The section of the resin layer covering the detectors is not contour-matched since it is important that the light path of the beam reflected by the inner wall surface of the resin be directed from the light source toward the detector. However, it is desirable to place the light source and the receiver of a given detector quite close together and to have the surface of the resin in front of the detector assembly, composed of light source and sensor, extend parallel to the detector and its mount.

In a design variation, the mount is located in a casing that serves as an outer enclosure for the resin and is highly transparent to the beams emitted by the light sources. This casing may consist for instance of polycarbonate. The refractive index of the material constituting the casing must be as close as possible to the index of the resin and of the LPG in the liquid phase.

The casing is preferably U-shaped. Each leg of the U is provided, for instance on its inner surface, with a longitudinal groove and the two grooves serve to accept the detector mount in such fashion that it extends parallel to the base of the casing. The detector mount is thus perfectly aligned in the casing, providing good parallelism between the base plane of the casing and the plane of the detector mount. Of course, surfaces other than these planar surfaces can be utilized for the base and the mount, but the planar configuration offers the advantage of being the easiest to implement.

For fitting the probe in the tank containing the LPG, the mount, the resin and possibly the casing are enclosed in a retaining head that is attached to the tank. This retaining head may for instance be a metal head equipped with an annular flange and bolted to the tank. This allows the heed to be mounted in the location usually occupied by a traditional float-type mechanical gauge, fastened to the tank with four screws.

To ensure proper electrical connection between the detectors of the probe and the outside of the tank, an insulated wire conduit is suitably installed in the retaining head.

According to one advantageous embodiment of the indicator per this invention, the mount supporting the detectors consists of a printed circuit board.

In a preferred design implementation the means for supplying electric power to the light sources and for processing the signals include a microprocessor or microcontroller.

Since the fill-level indicator only provides discrete i.e. discontinuous measurements, it will be desirable to prevent the needle of the gauge from dropping upon every change of the state of a detector. This is accomplished in that the signal processing means perform a smoothing function on the value of the gauge shift between the corresponding measurements of two neighboring detectors, simulating intermediate measurements between two actual measuring points by the interpolation of a mean gas consumption value during an average time period.

To avoid registering every interference-induced change in the state of the detectors which does not reflect the actual level of the liquid, caused by the splashing of droplets, a wave motion due to movements of the vehicle or a leaning of the vehicle, the signal processing elements include a change-of-state filtering provision for the detectors which establishes a time period during which no variation in the detection is to be registered. This time period can be relatively short, with a duration on the order of a few seconds, depending on the desired sensitivity level.

As an advantageous feature of this invention when applied to an automobile tank, the signal processing means are connected at one end to the electric distribution panel of the vehicle engine and at the other end to a solenoid valve installed on the tank filler inlet, enabling the solenoid valve to open up only when the engine is stopped and when the fluid is below a specific level, the maximum fill level being 80% of the tank capacity which corresponds to the position of the uppermost detector.

The device per this invention thus incorporates important safety functions. It should be noted that in conventional systems the overfill prevention is implemented by mechanical means employing a float, which again has the same shortcomings as those mentioned above in connection with the gauge.

To ensure highly safe operation of the device, the signal processing means include for instance a test function for all optical detectors and for the various electronic components which may be subject to possible malfunction.

For safety reasons, if the maximum-fill detector were to fail, its functions are automatically transferred to the next lower detector, or the filler solenoid valve remains closed.

The signal processing means which include a microcontroller or a microprocessor may also be designed in a way as to reduce electric power consumption when idle, i.e. when the vehicle is stopped, or to conserve the power for retaining control of the solenoid valve in the fill position. It is possible to provide these signal processing elements with an interface to the electronic fuel injection system for the purpose of enhanced performance and safety of the vehicle.

BRIEF DESCRIPTION OF THE DRAWINGS

This invention will be better understood with the aid of the following description with reference to the attached drawings, illustrating non-limiting examples of several forms of implementation of this device.

FIG. 1 shows the liquefied-petroleum-gas tank of a vehicle, equipped with a device per this invention together with its connections to various functional components of the vehicle;

FIGS. 2 and 3 represent two cross-sectional views of an optical detector respectively outside and inside the liquefied petroleum gas along lines II—II and III—III in FIG. 1;

FIGS. 4 and 5 respectively represent an exploded and an assembled view of the fill-level indicator according to this invention;

FIG. 6 is an exploded perspective view of a device per this invention and a corresponding retaining head;

FIG. 7 shows a cross-section through a detector; and

FIG. 8 is an exploded perspective view, on an enlarged scale, of the free end of the device per FIG. 6.

DETAILED DESCRIPTION OF THE PREFERRED EMBODIMENT

FIG. 1 illustrates a liquefied-petroleum-gas tank 2 designed for use in an automobile. Above the liquid gas 3 contained in the tank is a gaseous volume 4. The tank is equipped with an essentially conventional filler unit 5, mounted on which is a solenoid valve 6 that operates a flap 7 which depending on its position permits or blocks the filling of the tank The fill-level indicator incorporates a bar 8 which, in the implementation shown in the drawing, extends vertically inside the tank. This bar holds an array of detectors 9 each of which includes a light source 10 consisting for instance of a visible- or infrared-range light-emitting diode, and a receiver 12 consisting of a photoelectric cell or a photothyristor. The bar 8 may be in the form for instance of a printed circuit board. The various detectors 9 are attached to the bar 8 which serves as a mount and is encased in a synthetic resin 13 whose refractive index is close to the refractive index of the liquid gas. In the implementation per FIGS. 2 and 3 the optical axes of the light source 10 and the corresponding receiver 12 are parallel. The light source 10 and the receiver are close together and the surface of the resin 13 facing the detector 9 extends parallel to the mount 8 constituted of the flat printed circuit board. Correspondingly, the light beam emanating from the source 10 is reflected and directed toward the receiver 12. When the detector is positioned in the gaseous phase 4, the result as shown in FIG. 2 will be a nearly total reflection of the light beam toward the receiver 12, with the refractive index of the gas 4 being well below the index of the resin. By contrast, when, as shown in FIG. 3 and represented by the intersecting line III—III in FIG. 1, a detector is immersed in liquid gas, most of the light beam emitted by the source 10 is diffracted within the liquid gas 3, with the refractive indices of the liquid and of the resin 13 being very similar.

The analysis of the signals emitted by the different receivers 12 of the detectors 9 permits the determination of which detectors are immersed and which are not, and thus a measurement of the fill-level of the liquid.

As shown in FIGS. 4 to 8, one approach to implementing a fill-level indicator is to insert a bar 8 with detectors 9 in a casing 16 in the form of a U-shaped trough. The casing 16 is then filled with a synthetic material that is transparent to the light beam while perfectly insulating the detectors 9 as well as their power-supply and signal-acquisition elements from the liquid and gaseous fluids in the tank 2. An example of such synthetic material is epoxy resin.

The casing 16 is a channel with a U-shaped cross section. It thus has two legs 23 and a base 24. Each leg 23 is provided on its inside with a groove 25 that extends longitudinally over the entire length of the casing 16. The two grooves 25 are so designed that the printed circuit board mount 8 can slide and be guided in them and can be positioned parallel to the base 24 of the casing. The latter may be produced for instance of polycarbonate. The printed circuit board 8 is inserted in the casing 16 in such fashion that the detectors 9 face the base of the casing and are perfectly parallel to it.

Thus assembled, the casing is inserted in flush fashion in a retaining head 26. This retaining head, made of metal, is attached to the tank with four screws via an annular flange, not shown, in the location usually serving to accept a conventional mechanical float-based gauge. The metal head 26 absorbs the pressure exerted by the LPG in the tank 2. A cavity 27 matching the shape of the casing is provided in the retaining head 26 in such fashion that the head is translationally locked in place as the gas pressure bears on it. A fastening hole 32 serves to secure the casing 16 on the retaining head 26.

An insulated wire conduit 28 through which extend metal pins 29 is mounted in the retaining head 26, serving as the terminal pin connection. The male pin connectors thus protrude from the head 26 to the outside of the tank. They connect to an electronics box 17 which will be described further below. This link to the electronics box 17 is established for instance by means of female connectors, not shown, or by wires soldered to the male pin connectors, and is then potted in epoxy resin, sealing the assembly.

After all these components are assembled, the probe is laid sideways for encapsulation in epoxy resin which is applied by simple gravitational flow. The resin is carefully selected for its transparency to the emitted light beam and its compatibility with the LPG while at the same time ensuring good mechanical qualities in terms of hardness, electrical insulation and thermal resistance after polymerization. As shown in FIG. 8, for pouring the resin the end of the casing 16 opposite the retaining head 26 is covered with a lid 30 which tightly closes off the end of the casing. A space is left between the mount 8 and the lid 30 to allow the epoxy resin to flow on both sides of the mount 8.

The resulting trough is completely filled horizontally. When polymerized, the resin seals the assembly into a single solid block, galvanically insulating the electric currents from the LPG. In addition, the resin ensures perfect tightness of the casing and of the wire conduit in the head of the probe.

The horizontal pouring process permits substantial elimination of microbubbles within the resin, bubbles which could interfere with the optical path of the light beam emitted by a light source 10 of the detector 9.

Since the light sources 10 are very close to the receivers 12, the base 24 of the casing 16 must be flat. The distance between the detectors 9 and the base 24 of the casing, i.e. the thickness of the resin layer 13 covering the detectors 9, must be kept minimal so as to minimize any deviation of the light path on the flat surface.

To reduce possible interference with the transmission of the light beam to a minimum, the casing could conceivably be removed to leave only a block of resin 13 surrounding the mount 8 and the detectors 9. In fact, with the casing, even if the refractive indices of the resin and of the material constituting the casing are very close (about 1.5 to 1.6), the presence of a diopter between the resin and the casing causes a deviation of the light beam. Therefore, any such diopter should preferably be avoided. This leads to an implementation as shown in FIG. 7 which is a cross-sectional view of a probe without a casing. The result is a mount 8 with detectors 9, as shown in FIGS. 2 and 3, encapsulated in a block of resin 13.

As indicated in FIG. 1, the bar 8 connects to an electronics box 17. This box on its part is connected to the battery 18 of the vehicle, to the distribution panel 19 permitting electric current to be fed to the engine, to the fuel fill-level display gauge 20 on the vehicle dashboard, and to the electronic engine fuel injection system 22. The electronics box 17, possibly comprising a microprocessor or microcontroller, feeds power from the battery 18 to the diodes 10 which constitute the light sources. This box 17 performs various signal processing functions aimed both at providing a readout of the liquid gas level in the tank and at assuring a safe installation.

Note that the probe delivers only discontinuous measurements. To avoid having the needle of the gauge 20 drop every time there is a change in state of a detector, a smoothing function is provided which permits a gradual decline of the needle by simulating intermediate measurements between two actual measuring points, with an interpolation of a mean gas consumption value over an average length of time. The smoothing function is reset for the change of state of each detector.

The box 17 also ensures a filtering of sudden changes of state of the detectors by integrating a time delay during which detection variations will not register.

The bottom-most detector, when immersed in the liquid, sends to the electronics box 17 a signal permitting it, for example, to initiate the automatic switchover to gasoline for fueling the engine.

For safety reasons and especially in order to allow for an increased pressure of the gaseous phase in higher temperature conditions, the tank must not be filled more than 80% of its total capacity. It is therefore possible to install a maximum-level detector which, when activated by a high level of liquid, sends a signal to the electronics box on the basis of which the latter can instruct the solenoid valve 6 to ensure the closure of the filler unit. The electronics box 17 is also connected to the distribution panel 19 for the purpose of preventing the filling of the tank while the engine of the vehicle is running.

The detectors 9 are mounted at space intervals carefully chosen in consideration of the shape of the tank. Accordingly, they are closer together in the bottom part of the tank to assure greater measurement accuracy as the liquid level approaches the fuel "reserve". This irregular placement of the detectors permits employing the same signal processing electronics regardless of the type of tank. The optical probe itself (the detectors encapsulated in resin) is specifically adapted to each type of tank while the signal processing module (measurement interpretation, smoothing, actuator control, message to the dashboard gauge, etc.) remains the same for all models, thus considerably reducing manufacturing costs.

The electronics box 17 ultimately ensures automatic control of the detectors by sending a signal in the event one of the detectors is malfunctioning. If the maximum-fill-level detector fails, its functions are immediately transferred to the next lower detector. As an alternative, the microcontroller or microprocessor can interdict any refilling while that detector is failing by keeping the solenoid valve closed.

Turning off the engine triggers the opening of the solenoid valve on the filler unit for a duration τ. If during that time period τ the 80% maximum-fill-level detector or the engine starter are not used, a delay device causes the solenoid valve to close.

As will be evident from the above, this invention constitutes a major improvement on the state of the art by providing a fill-level indicator for liquefied petroleum gas tanks that is compact, has no moving parts, is not affected by normal pressure or temperature fluctuations in the range respectively from 0 to 30 bars and minus 20° C. to plus 65° C., while offering excellent accuracy and outstanding reliability.

It goes without saying that this invention is not limited to the design implementations described above by way of examples but, on the contrary, it embraces all possible variations. Specifically, the number of detectors may differ, their placement in the tank may differ, and the shape of the casing associated with the detectors may differ, without departing from the substance of this invention.

What is claimed is:

1. Fill-level indicator for use in a liquefied petroleum gas tank, comprising:
   an array of optical detectors attached to a mount, vertically spaced apart from one another and distributed inside the tank over a height of the tank, each detector including a light source and a receiver, and
   means for feeding power to the light sources of the various detectors, for processing signals arriving at the various receivers and for transmitting signals to a gauge displaying a fill-level of the liquefied gas,
   wherein the mount and the detectors placed thereon are positioned in a casing which is highly transparent to light beams emitted by the light sources and wherein a synthetic resin which is highly transparent to the light beams emitted by the light sources is disposed between one surface of the casing and the detectors for encapsulating the mount and the detectors such that a surface of the resin facing the detectors reflects a light beam emitted by the corresponding light source toward the associated receiver, and
   wherein the casing comprises a material having a refractive index very close to that of the resin.

2. Fill-level indicator as in claim 1, wherein when used in an automobile tank, the means for feeding power and for processing the signals is connected at one end to a distribution panel for feeding electric current to an engine of a vehicle and at the other end to a solenoid valve mounted on a filler unit of the tank, for permitting the opening of the solenoid valve only when the engine is stopped and the fill level is below a specific point, and wherein about 80% of a maximum capacity of the tank is represented by the detector in an uppermost position.

3. Fill-level indicator as in claim 1, wherein the resin is an epoxy resin.

4. Fill-level indicator as in claim 1, wherein the casing comprises polycarbonate.

5. Fill-level indicator as in claim 1, wherein the casing is in the form of a U-shaped profile, legs of the U each including on an inside thereof a longitudinal groove, whereby the grooves accept the mount with the detectors such that the mount extends parallel to a base of the casing.

6. Fill-level indicator as in claim 1, wherein the mount, the resin and the casing are flush-mounted in a retaining head designed to be attached to the tank.

7. Fill-level indicator as in claim 6, wherein the retaining head is a metal head equipped with an annular flange and attached to the tank.

8. Fill-level indicator as in claim 6, wherein an insulated wire conduit is installed in the retaining head.

9. Fill-level indicator as in claim 1, wherein the mount comprises a printed circuit board.

10. Fill-level indicator as in claim 1, wherein the means for feeding power to the light sources and for processing the signals include a microprocessor or a microcontroller.

11. Fill-level indicator as in claim 1, wherein the means for feeding power and for processing the signals performs a smoothing of a shift value of the gauge between measurements of two neighboring detectors by simulating intermediate measurements between two actual measuring points, interpolating a mean gas consumption during an average time period.

12. Fill-level indicator as in claims 1, wherein the means for feeding power and for processing the signals includes a filtering of the change of state of the detectors by integration of a time lag during which no detection variation is to be registered.

13. Fill-level indicator as in claim 1, wherein the means for feeding power and for processing the signals performs a detector test function within a specific periodic cycle.

14. Fill-level indicator as in claim 13, wherein in the event of a failure of a maximum-fill-level detector functions of the maximum fill-level detector are automatically transferred to a next lower detector, or filling of the tank is rendered impossible by keeping a solenoid valve closed.

* * * * *